United States Patent [19]

Dave

[11] 4,001,443

[45] Jan. 4, 1977

[54] PACKAGE AND METHOD FOR PACKAGING AND STORING CUT LEAFY VEGETABLES

[75] Inventor: Bhalchandra Anantray Davé, Glendora, Calif.

[73] Assignee: Pennwalt Corporation, Philadelphia, Pa.

[22] Filed: Feb. 24, 1976

[21] Appl. No.: 660,895

Related U.S. Application Data

[63] Continuation-in-part of Ser. No. 656,921, Feb. 10, 1976, abandoned.

[52] U.S. Cl. .............................. 426/106; 426/262; 426/326; 426/335; 426/415; 426/419
[51] Int. Cl.² ...................... A23L 3/34; A23B 7/14; B65B 25/04
[58] Field of Search .......... 426/335, 326, 316, 318, 426/410, 411, 413, 415, 418, 419, 106, 127, 262

[56] References Cited

UNITED STATES PATENTS

| | | | |
|---|---|---|---|
| 2,531,463 | 11/1950 | Pryor | 426/318 |
| 3,450,542 | 6/1969 | Badran | 426/316 X |
| 3,630,759 | 12/1971 | Rumberger | 426/413 X |
| 3,814,820 | 6/1974 | Busta et al. | 426/262 |

*Primary Examiner*—Steven N. Weinstein

[57] ABSTRACT

A method of improving the shelf life of cut leafy vegetables wherein the cut vegetables are treated with an aqueous chlorine bath, dried to remove adhered water from said bath and enclosed in a sealed, evacuated package of a flexible sheet material having specified gas and moisture permeabilities; and the resultant produce, are disclosed herein.

10 Claims, No Drawings

PACKAGE AND METHOD FOR PACKAGING AND STORING CUT LEAFY VEGETABLES

This is a continuation-in-part of copending application Ser. No. 656,921 filed Feb. 10, 1976, now abandoned.

The problems of commercial handling and storing of cut vegetables prior to use such as slime formation, discoloration, off-flavors, microorganism growth and accompanying short shelf life, have been recognized in the past and attempts have been made to alleviate such problems. While some of the above problems have been at least partially overcome, there is a need to further improve the shelf life of packaged, cut leafy vegetables.

It is a primary object of this invention to provide a method of improving the shelf life of packaged, cut leafy vegetables; and It is a further object of this invention to provide packaged cut leafy vegetables which demonstrate improved shelf life.

These and other objects are realized in accordance with this invention which includes a method of increasing the storage life of cut leafy vegetables comprising (1) contacting said cut vegetables for from about 5 to about 20 seconds with an aqueous solution having from about 70 to about 150 volume per million of chlorine, a buffered pH of from about 5 to about 7 and a temperature ranging from about 45° to about 60° F., (2) removing adhered moisture of said aqueous solution from said cut vegetables, (3) placing said cut vegetables into a sealable package of a flexible sheet material having a water vapor transmission rate of from about 0.02 to about 3 grams per 100 square inches per 24 hours per mil at 90 percent relative humidity and 100° F., a nitrogen gas permeability of from about 0.01 to about 3.0, an oxygen gas permeability of from about 0.3 to about 10 and a carbon dioxide gas permeability of from about 0.3 to about 35, said gas permeabilities being measured in cubic centimeters per 100 square inches per 24 hours per mil at standard temperature and pressure; (4) partially evacuating air from said package; (5) sealing said package; and (6) storing said package at a temperature from about 35° to about 45° F. and a relative humidity of about 85 to about 100 percent.

The resultant packaged product is a chlorine-washed, surface dry, cut leafy vegetable having improved storage stability enclosed in a sealed, partially air-evacuated, fog resistant package of a flexible material as described above.

The flexible packaging material which is used herein as the enclosure for the cut leafy vegetables is preferably a clear, thermoplastic polyester film however, any coated or uncoated sheet material or film of suitable strength and flexibility which meets the moisture and gas permeability requirements will be useful. Packaging material meeting these specifications will tend to prevent discoloration and fogging during extended storage.

The aqueous chlorine solution which is useful for this process and resultant product is preferably a water bath containing from about 70 to 150 volume parts per million of gaseous chlorine and buffered to a pH of about 5 to about 7 with an innocuous buffering salt for example potassium monobasic phosphate at a concentration of about 1%. The aqueous solution is maintained at a temperature of about 45° to about 60° F., preferably 50° to 60° F. and in the hot summer preferably about 45° to 50° F. The chopped leafy vegetable is advantageously dipped into the bath for a period of time 5 to 20 seconds depending on the particular leafy vegetable and the chlorine concentration of the bath. A spray operation, to apply the aqueous chlorine to the leafy vegetable, which provides an equivalent treatment in chlorine concentration temperature and time, may be used if desired.

After application of the aqueous chlorine solution, the treated leafy vegetable is drained immediately and adhered moisture from the aqueous chlorine solution is removed. Advantageously, to remove the adhering moisture as quickly as possible without damaging the produce, the cut leafy vegetable is placed in a basket-type centrifuge which is rotated at, for example, 1600 RPM for 1.5 minutes. While this treatment removes adhering moisture, it does not dehydrate the vegetable thereby allowing it to remain with its natural water content.

After removal of the adhering moisture, the leafy vegetable is placed into bags of a suitable size, and of a packaging material as described herein and sufficient air is evacuated from the bag to collapse the walls of the bag around the produce without damage thereto. The bag opening is sealed, by heat sealing between two heated bars or plates, by adhesives or by twisting the bag neck and applying bag ties which provide a suitably tight closure.

The cut leafy vegetables include, for example, shredded lettuce, and chopped cabbage.

In addition to the cut leafy vegetables packaged in this manner, other salad vegetables may be mixed therewith, for example, cut carrots radish, beets, onion, parsley, celery and the like.

The following is a specific example of the method of this invention and the resultant product.

EXAMPLE

Wrapper leaves and core material of head lettuce were removed and the lettuce was shredded for utilization in salads. The shredded lettuce was placed in a wire basket which was immersed in a water bath containing 80 volume parts per million of chlorine and 1 percent by weight potassium monobasic phosphate to buffer the pH of the bath to about 6. The bath was kept at a temperature of about 55° F. and the treatment time was 10 seconds. The treated lettuce was removed from the bath, allowed to drain and placed in a basket-type centrifuge. The lettuce was centrifuged to remove adhered bath moisture without leaf damage by spinning to 90 seconds at 1600 RPM.

The dried shredded lettuce was placed into a thermoplastic polyester film bag, having a film thickness of 55 gauge, to fill the bag without force. The air in the bag was partially evacuated to permit its walls to collapse around the lettuce without damage thereto, and it was closed by twisting the bag neck and fastening the twisted neck with a wire bag tie. The resultant package was then stored at a temperature of 35°– 38° F., and at 95% relative humidity.

The polyester film from which the bag was constructed had the following moisture and gas permeabilities.

| | |
|---|---|
| WVTR* | 1.7–1.8g/100 sq.inc./24hrs./mil at 100° F and 90% RH |
| $O_2$ | 6–8** |
| $N_2$ | 0.7–1.0** |

| | |
|---|---|
| $CO_2$ | 15–25** |

*Water vapor transmission rate
**Cubic centimeters/100 square inches/24 hours/mil at standard temperature and pressure (STP)

The shelf life of the packaged shredded lettuce was found to be between 3 and 4 weeks and the package exhibited no fogging. This is a distant improvement over shredded lettuce which has been stored after either the above chlorine treatment alone, the chlorine, treatment and subsequent centrifugation, an aqueous bisulfite (antioxidant) treatment presently in commercial use, or shredded lettuce given three distinct aqueous chemical treatments with intervening water baths as described in U.S. Pat. No. 3,814,820.

The shelf life of conventionally packaged treated salad in polyethylene bags (WVTR of 1–2 grams and gas permeabilities for $N_2$, $O_2$, and $CO_2$ of 180, 500 and 2700 cc/100 sq. inches per 24hrs/mil respectively) was only about 8–10 days indicating the improved shelf life of salad treated and packaged in bag film as described herein.

The treatment of the example was repeated for chopped green cabbage, except that the treatment bath contained about 125 volume parts per million of chlorine, the treatment time was 15 seconds, and the centrifugation was for 60 seconds. The packaged, chopped cabbage, stored at 40° F., kept for up to 4 weeks.

Mechanically, the process can be advantageously modified by utilizing a continuous spraying system for the buffered chlorine solution in cooperation with a reversible conveying belt to alternatively feed treated cut leafy vegetables to two centrifuges thereby providing faster production of the packaged product.

The use of bags of assorted sized permits expanded markets for prepared salads as convenient, ready-made salad for individual or family as well as institutional use.

The present process provides a package of cut leafy vegetables having improved shelf life with a one step chemical treatment in comparison, for example, to the three step chemical treatment of U.S. Pat. No. 3,814,820. The treated and packaged salad of this invention is allowed to maintain the minimum necessary biochemical activity during its storage in the bag of specified permeability characteristics; hence, the freshness, crispness and unwilted appearance is maintained for a longer time than conventionally treated and packaged salad preparations wherein the packaging film does not meet the specified permeability characteristics of the packaging material of this invention.

The gas permeabilities as set forth herein are measured in accordance with the test procedure of ASTM* No. D1434; and the water vapor transmission rates as set forth herein are measured in accordance with the test procedure of ASTM* No. E96.

*American Society for Testing Materials

What is claimed:

1. A method of increasing the storage life of cut leafy vegetables comprising (1) contacting said cut vegetables for from about 5 to about 20 seconds with an aqueous solution having from about 70 to about 150 volume parts per million of chlorine, a buffered pH of from about 5 to about 7 and a temperature ranging from about 45° to 60° F., (2) removing the adhered moisture of said aqueous solution from said cut vegetables, (3) without further chemical treatment and prior to storage placing said cut vegetables into a sealable package of a flexible sheet material having a water vapor transmission rate of from about 0.02 to about 3 grams per 100 square inches per 24 hours per mil at 100° F and 90 percent relative humidity, a nitrogen gas permeability of about 0.1 to about 3.0, an oxygen gas permeability of about 0.3 to about 10 and a carbon dioxide permeability of from about 0.3 to about 35, said gas permeabilities being measured in cubic centimeters per 100 square inches per 24 hours per mil at standard temperature and pressure, (4) partially evacuating air from said package in an amount sufficient to collapse the package wall about the vegetables but without damaging said vegetables, (5) sealing said package, and (6) storing said package at a temperature from about 35° to about 45° F. and a relative humidity of about 85 to about 100 percent.

2. The method of claim 1 wherein the cut leafy vegetable is shredded lettuce.

3. The method of claim 1 wherein the cut leafy vegetable is chopped cabbage.

4. The method of claim 1 wherein the flexible sheet material is thermoplastic polyester film.

5. The method of claim 1 wherein the adhered moisture is removed from the cut leafy vegetables by centrifugation.

6. A sealed, fog resistant package of chlorine-treated, surface-dry cut leafy vegetables having improved storage stability, wherein said vegetable are treated in accordance with claim 1, said package having air evacuated therefrom in an amount sufficient to collapse the walls thereof about said cut leafy vegetables without damage thereto and the package walls consisting essentially of a flexible sheet material having a water vapor transmission rate of from about 0.02 to about 3 grams per 100 square inches per 24 hours per mil at 100° F. and 90 percent relative humidity, a nitrogen gas permeability of from about 0.1 to about 3.0, an oxygen gas permeability of from about 0.3 to about 10 and a carbon dioxide gas permeability of from about 0.3 to about 35 said gas permeabilities being measured in cubic centimeters per 100 square inches per 24 hours per mil at standard temperature and pressure.

7. The package of cut leafy vegetables of claim 6 wherein the vegetable is shredded lettuce and the flexible sheet material is thermoplastic polyester film.

8. The method of claim 1 wherein the cut leafy vegetables contact the aqueous solution by immersion of said cut vegetables into a bath of said solution.

9. The method of claim 8 wherein the adhered moisture is removed by centrifugation.

10. The method of claim 9 wherein the cut leafy vegetable is shredded lettuce.

* * * * *